April 21, 1964    M. BRACUTT    3,129,592
INERTIAL INTEGRATING ACCELEROMETERS
Filed Nov. 10, 1958    5 Sheets-Sheet 1
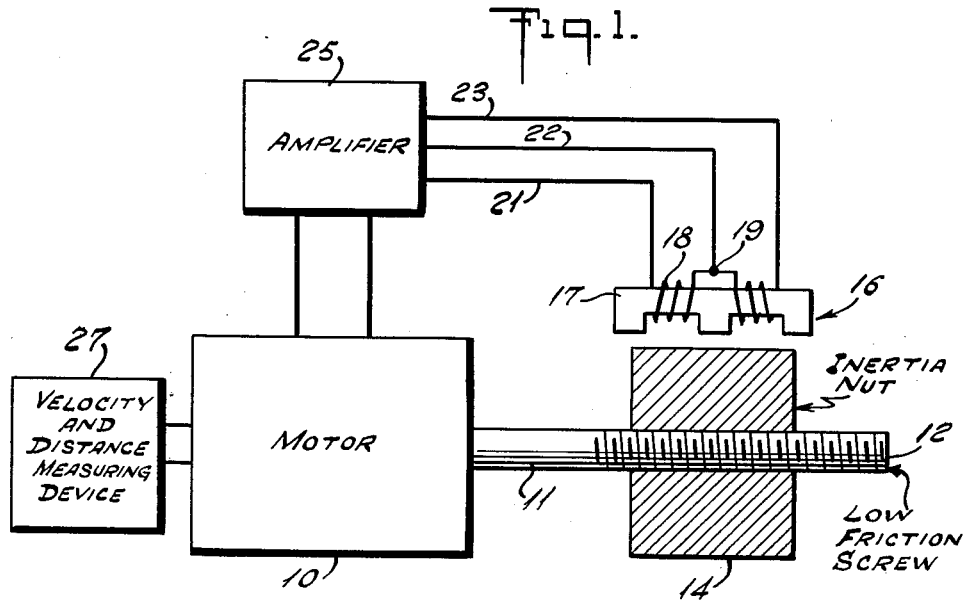
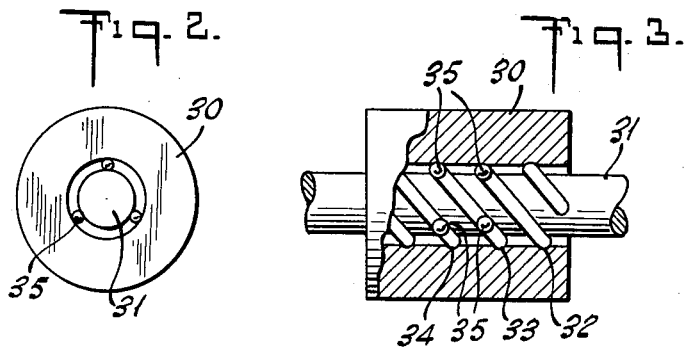
INVENTOR
MICHAEL BRACUTT
BY
Moses, Nolte, & Nolte
ATTORNEYS

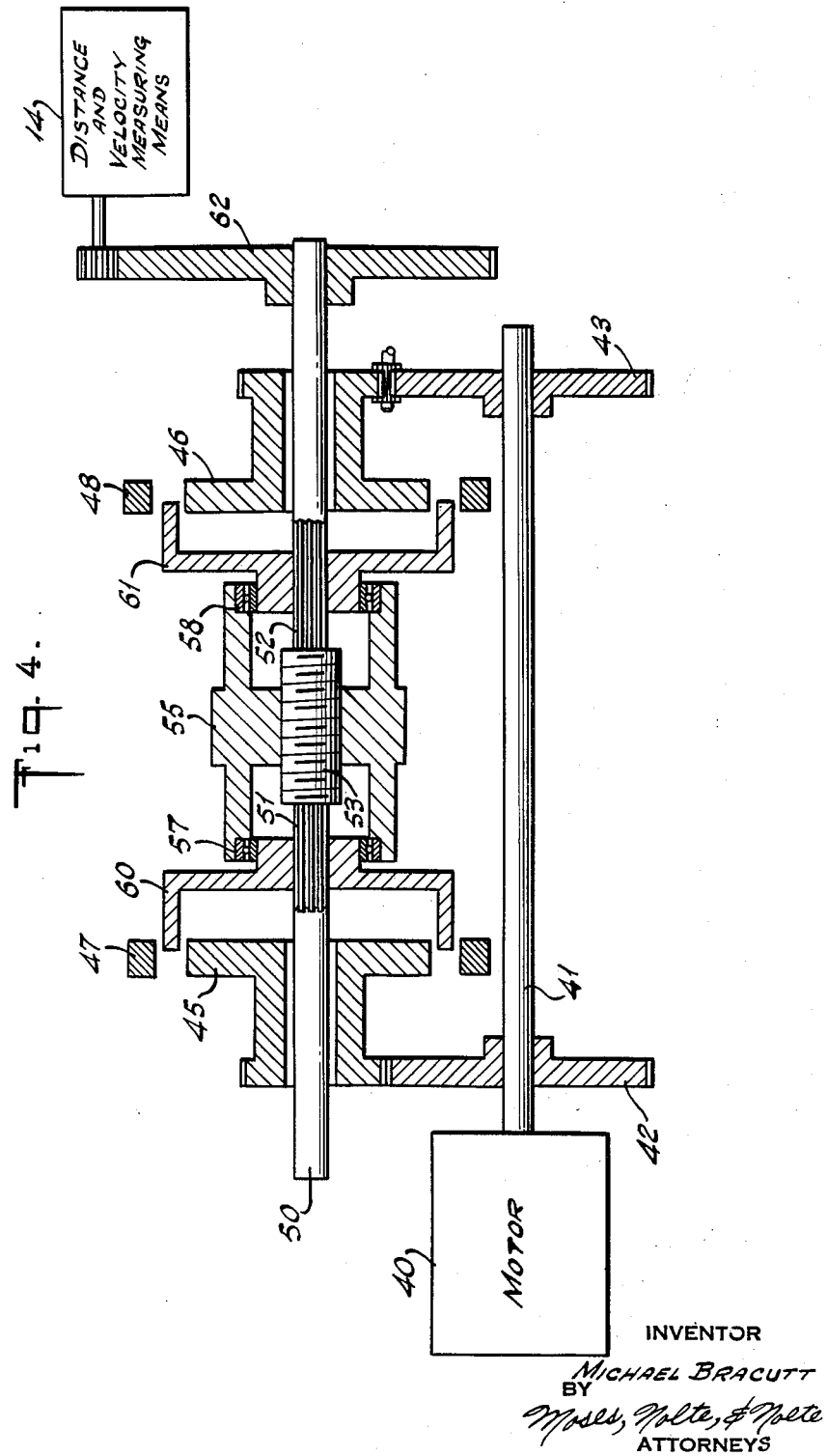

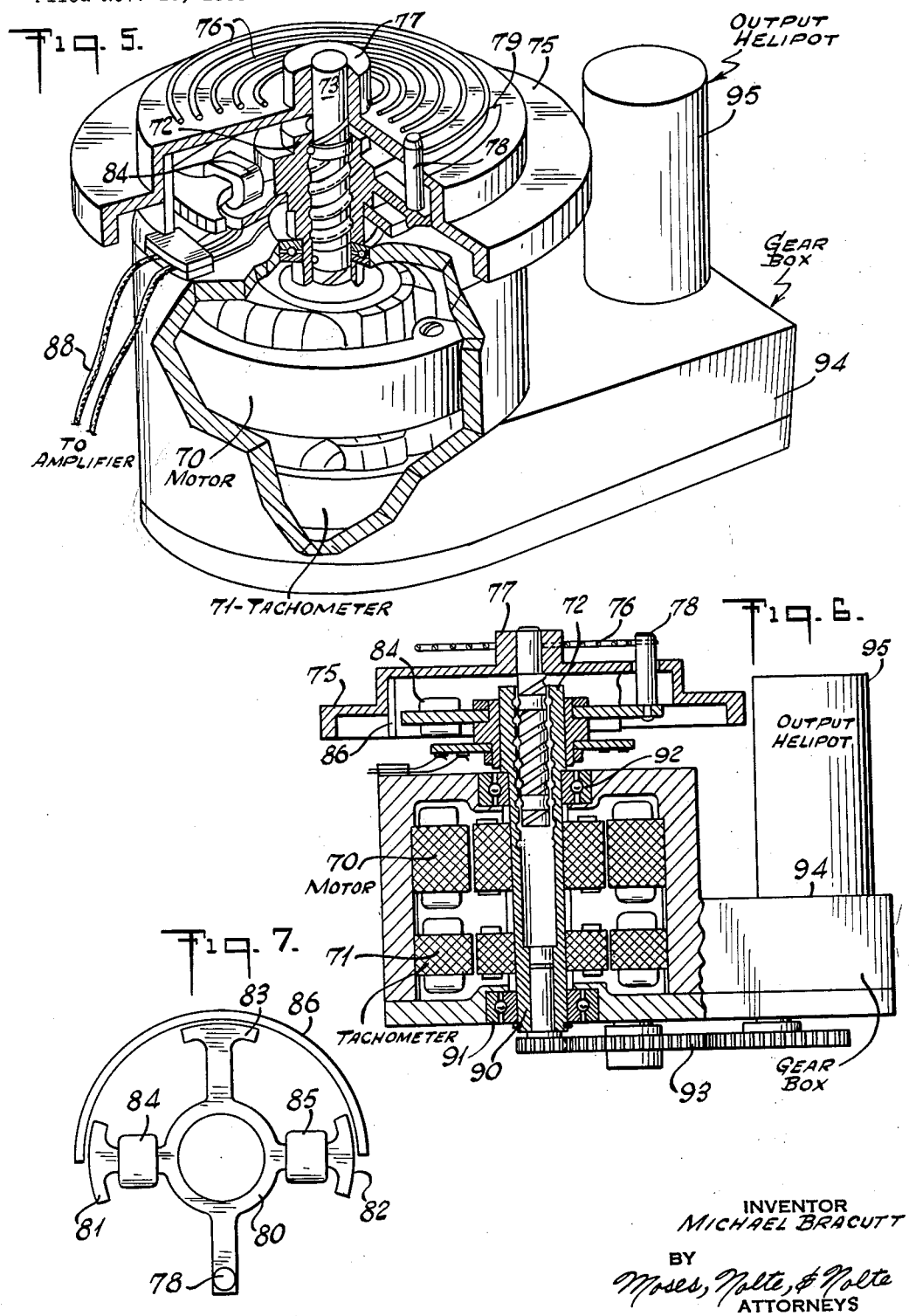

April 21, 1964 M. BRACUTT 3,129,592
INERTIAL INTEGRATING ACCELEROMETERS
Filed Nov. 10, 1958 5 Sheets-Sheet 4

INVENTOR
MICHAEL BRACUTT
BY
Moses, Nolte, & Nolte
ATTORNEYS

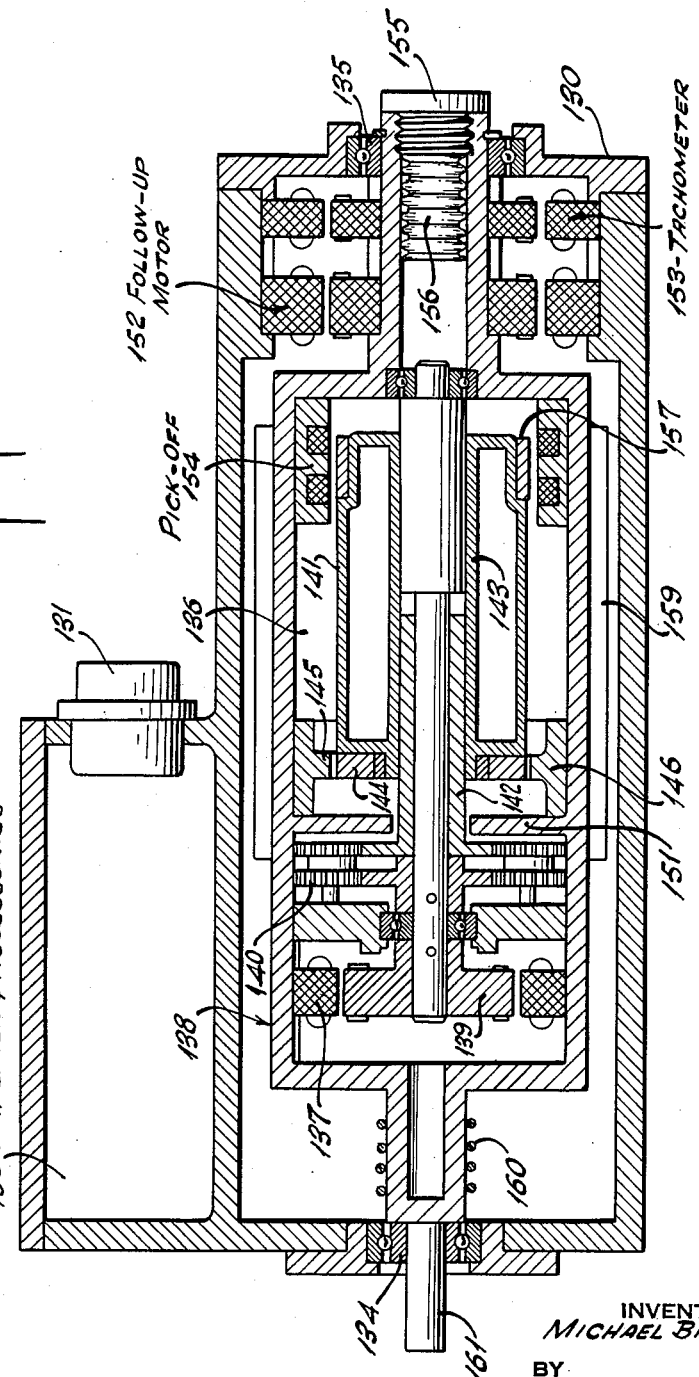

United States Patent Office 3,129,592
Patented Apr. 21, 1964

3,129,592
INERTIAL INTEGRATING ACCELEROMETERS
Michael Bracutt, East Orange, N.J., assignor to Maxson Electronics Corporation, a corporation of New York
Filed Nov. 10, 1958, Ser. No. 773,026
9 Claims. (Cl. 73—490)

The present invention relates to an integrating accelerometer and provides a single unit for integrating the acceleration in order to measure the velocity and distance of travel of a vehicle carrying the accelerometer.

It is an object of the invention to provide an integrating accelerometer which is relatively simple and inexpensive for providing acceleration threshold sensitivities of the order of $10^{-2}g$.

The accelerometer according to the invention comprises a pair of threaded members forming a low friction nut and screw, and of which serves as an acceleration sensing mass free to ride on the other member, a motor to drive the other member, a pick-off device to sense the movement of the acceleration mass and means responsive to the pick-off device for controlling the rotation of the other threaded member by the motor. The limitation of threshold sensitivity of the accelerometer according to the invention is due to the static friction of the acceleration-sensing element. The static friction may be made low enough to permit sensing $10^{-2}g$. According to one embodiment of the invention, this is accomplished by high precision, low friction torque ball bearings. The static friction referred to above is actually the rolling friction between the ball and the groove.

The invention will be fully understood from the following description and the drawings in which:

FIG. 1 is a schematic diagram of one embodiment of the invention;

FIG. 2 is an end view of an inertia nut having a ball bearing mounting on a screw;

FIG. 3 is a front view, partly in section, of the nut and screw shown in FIG. 2;

FIG. 4 is a schematic diagram of another embodiment of my invention;

FIGS. 5, 6 and 7 illustrate another embodiment of the invention;

FIG. 10 is a sectional view of still another embodiment of the invention.

Figure 8:
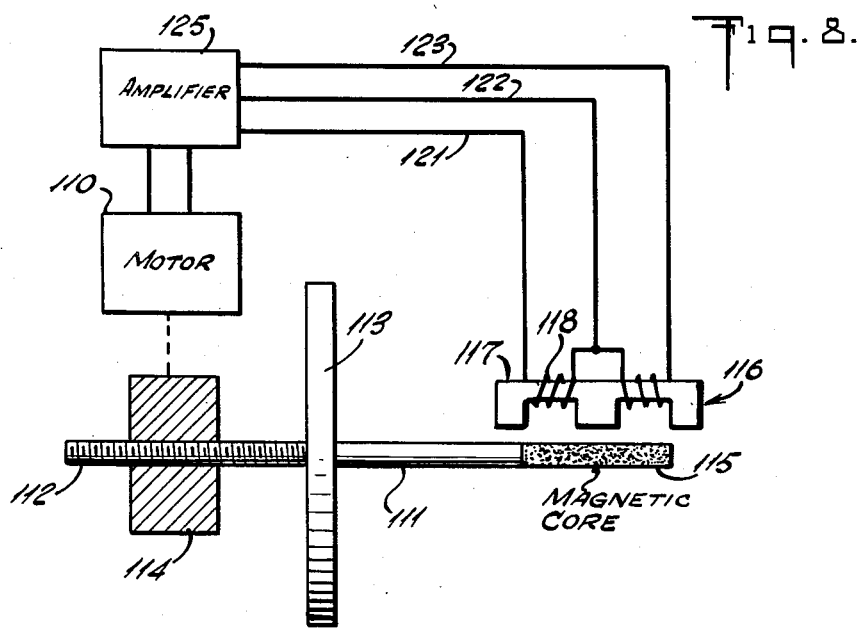
FIG. 8 is a schematic diagram similar to that of FIG. 1 of another embodiment of the invention.

Referring to FIG. 1, there is shown a motor 10 having a shaft 11 a portion of which is formed as a low friction screw 12, an acceleration sensitive mass in the form of a nut 14 is mounted on the screw 12, a pick-off, or sensing element 16 is positioned adjacent the nut 14. The pick-off device 16 has a magnetic core 17 which may be provided with suitable pole pieces and be formed, for example, as an E-shaped member. A balanced winding 18 having its center tap 19 is mounted on the core 17. The winding 19 is connected by leads 21, 22 and 23 to an amplifier 25. The output of the amplifier 25 is connected to the motor.

If the apparatus is mounted on a vehicle, acceleration of the vehicle will cause the nut 14 to rotate and move off the equilibrium position. A linear displacement of the nut will be sensed by the pick-off device 16 which reproduces a signal proportional to the displacement. It will be understood, of course, that the movement of the nut 14 will differentially vary the inductance of the two halves of coil 18 and the reluctance of the magnetic paths through the coil. These variations may be used in various obvious ways for suplying a signal to the amplifier. For example, oscillatory currents fed through the two halves of coil 18 will be varied differentially in accordance with the movement of nut 14. The output signal of amplifier 25 drives the motor in either direction with a sufficient speed to restore the nut to its equilibrium position. The rotation of screw 12 is in the same direction as the nut 14 is rotated due to acceleration. When acceleration ceases, the nut and screw rotate together at constant velocity. A relative velocity between the nut and the screw exists in proportion to the acceleration. The angular velocity and the angular displacement of the screw are measures of the velocity and the distance traveled, respectively, of the vehicle. Hence, a suitable angular velocity and angular displacement measuring device 27, such as a helical potentiometer, for example, may be connected to shaft 11 to measure the velocity and distance. Devices for measuring the speed and angular displacement of a rotating shaft are well known in the art.

The requirements of minimum error are as follows:

(A) Low static friction between nut and screw.

(B) Low running friction between nut and screw and in motor bearings.

(C) A high system gain to minimize the effect of running frictions.

(D) A pick-off with a minimum of dead space.

The static friction between nut and screw is a critical factor since it affects the threshold sensitivity. Therefore, it is important to provide a nut and screw action having the lowest possible static friction. One such device is shown in FIGS. 2 and 3, having high precision, low friction torque ball bearings. The nut 30 which corresponds to the nut 14 of FIG. 1 is mounted on a shaft 31. The shaft and nut are provided with helical grooves or raceways 32, 33 and 34 and balls 35 in the raceways. There may be two balls in each groove. A case or other means to retain the balls may not be required since the axial movement is limited and any creep that occurs would not be sufficient ordinarily to cause the balls to escape containment over a limited period of time. However, a ball retainer may be provided, if desired.

FIG. 4 schematically shows an embodiment of the invention which does not require a feedback amplifier. A continuous running motor 40 drives a shaft 41 which through gearing 42 and 43 rotates permanent magnet rotors 45 and 46 in opposite directions. Yokes 47 and 48 are mounted adjacent magnetic rotors 45 and 46. The yokes 47 and 48 may rotate with the permanent magnets and may be formed in any suitable way so that a strong magnetic field is provided in the gaps between the magnets and yokes. The shaft 15 is rotatably mounted within rotors 45 and 46. The shaft 15 is provided with splines 51 and 52 and a screw 53. An inertia nut 55 corresponding to the nut 14 of FIG. 1 is mounted on screw 53. Nut 55 is provided with bearings 57 and 58. A pair of drag cups 60 and 61 are disposed on splines 51 and 52 of shaft 50 so that the drag cups may slide axially on shaft 50 but rotate therewith. Shaft 50 may be provided with a take-off gear 62 for driving a suitable distance and velocity measuring apparatus 64, which may be a helical potentiometer.

When an acceleration or a deceleration occurs, nut 55 is rotated in one direction or the other and also moves axially so as to move the drag cups 60 or 61 further into the gap between one of the permanent magnet rotors and the adjacent yoke. That drag cup is then rotated at a higher velocity, thus rotating shaft 50 and screw 53 in a direction to restore the nut 55 to equilibrium. This rotation of shaft 50 will persist until some change in velocity occurs. Accordingly, gear 62 will rotate during this time correspondingly. The speed of rotation and the number of revolutions of shaft 50 will correspond to the velocity and distance traveled of the vehicle on which the accelerometer is mounted. Any suitable apparatus for measuring the speed of rotation and the amount of rotation may be used as a velocity and distance measuring device 64.

Referring now to FIGS. 5 to 7 there is shown another embodiment of the invention having the same circuit configuration as that of FIG. 1, and arranged to respond to accelerations in opposite directions. In the accelerometer of FIGS. 5 to 7 the inertial mass, instead of being a nut, is a low-friction screw, and the nut is attached to the motor. On the shaft of motor 70 is a tachometer 71. The tachometer 71 provides a damping or a viscous friction factor for stabilizing the operation. A nut 72 is integral with the rotor of the motor. Within the nut 72 is a screw 73 having a low friction ball bearing coupling to the nut such as illustrated in FIG. 2. An inertia disc 75 is connected to screw 73 and rotates therewith. A torsion spring 76 exerting a force of 1g is connected at its inner end to the collar 77 of inertia disc 75 and at its other end to the spring pin 78. The pin 78 is adapted to move through an arcuate slot 79 in disc 75. A pick-up device 80 is provided with poles 81, 82 and 83 and a pick-up coil having two preferably equal sections 84 and 85. Inertia disc 75 is provided with a yoke 86. It will be seen that pick-up device 80–86 is equivalent to pick-up device 16 of FIG. 1. The outputs of coil 84–85 are fed through slip rings to the output terminals or leads 88.

The motor shaft 90 is mounted in ball bearings 91 and 92 and is connected through gearing 93 and a gear box 94 to a suitable output device which may be a precision potentiometer of the helical type having a linear characteristic. The operation of the accelerometer shown in FIGS. 5 to 7 will be understood in the light of the description of the operation of the accelerometer of FIGS. 1 to 4. The screw 73 is caused to move by inertial force rather than the nut, as in FIGS. 1 to 4. The 1g spring 76 compensates for gravity. The spring also accommodates the small axial movement of the inertial disc but the only effect is a small inconsequential change of the spring constant. The relative angular movement between the nut and the screw due to an acceleration causes an unbalancing of sections 84 and 85 of the pick-up coil and thus feeds a signal through leads 88 to an amplifier whose output is connected to the motor in the same manner as in FIG. 1. Thus, the speed and direction of rotation of the motor is controlled in accordance with the acceleration. The nut and screw turn together at the same velocity until an acceleration occurs, whereupon the velocity of nut 72 is changed in the same direction as the change in velocity of the screw to re-establish equilibrium. If the accelerometer is mounted on a vehicle the total vertical distance traveled will correspond to the output voltage or resistance of the potentiometer.

The accelerometer of FIG. 8 is similar to that of FIG. 1, but the acceleration sensing element is a flywheel 113 mounted on a shaft 111. The end of shaft 111 is formed as a low friction screw 112 on which nut 114 is mounted for free running. The other end of shaft 111 is in the form of a magnetic core 115 juxtaposed to a pick-off element 116. Element 116 may be the same as element 16 of FIG. 1 and includes a core 117 and a coil 118 connected by wires 121, 122 and 123 to an amplifier 125 whose output drives motor 110. The motor 110 turns the nut 114.

The operation of the accelerometer of FIG. 8 is essentially the same as that of FIG. 1 and its operation will be fully understood from the explanation of FIG. 1. The acceleration of the vehicle on which the accelerometer is mounted causes the screw 112 and flywheel 113 to rotate and move axially off the equilibrium position. Linear displacement of the screw and shaft is sensed by the pick-off device 116 which produces a signal in proportion to displacement. This signal is fed to amplifier 125 and the amplified signal from the amplifier drives the motor to restore the shaft 111 to its equilibrium position. The follow up rotation of the nut is in the same direction as the screw is rotated. When the acceleration ceases the nut and the screw rotate together at constant velocity. Displacement between the nut and the screw is proportional to acceleration; hence the relative velocity between them is proportional to the rate of change of acceleration. The screw displacement can be made small by use of a high gain amplifier. The rotation of the nut may be used to drive means for measuring the distance traveled by the vehicle.

The factors and relationships involved in the accelerometer of FIG. 8 are demonstrated by the following mathematical analysis:

To develop the scale factor between applied acceleration and angular displacement of the nut we can use the Lagrangian equation in the form $$\frac{d}{dt}\left(\frac{\partial T}{\partial \dot{q}_s}\right)=Q_s \qquad (1)$$

where T is the total kinetic energy of the system, $q_s$ is a generalized coordinate, and $Q_s$ is a generalized force
Let $\theta_s$ = angular displacement of the screw
$\theta_n$ = angular displacement of the nut
$x_s$ = linear displacement of the screw
$r$ = pitch radius of the screw
$\alpha$ = pitch angle of the screw then $$x_s = (\theta_s - \theta_n) r \tan \alpha \qquad (2)$$

or $$Cx_s = \theta_s - \theta_n$$

where $$C = \frac{1}{r \tan \alpha} = \text{pitch constant}$$

The total kinetic energy of the system is given by:

$$T = \tfrac{1}{2} I_n \theta_n^2 + \tfrac{1}{2} I_s \theta_s^2 + \tfrac{1}{2} M_s \dot{x}_s^2$$

where I and M are inertia and mass respectively.
Eliminating $\theta_s$ by the use of the first derivative of Equation 2 yields $$T = \tfrac{1}{2}(I_s + I_n)\theta_n^2 + \tfrac{1}{2}(M_s + I_s C^2)\dot{x}_s^2 + I_s C \theta_n \dot{x}_s \qquad (3)$$

Equation 1 can now be applied considering $x_s$ and $\theta_n$ as the generalized coordinates. The corresponding generalized forces are:

$$Q_x = M_s a - F_{ns} \dot{x}_s$$
$$Q_n = K_m x_s - F_m \theta_n$$

where $a$ is the applied acceleration
$F_{ns}$ is a viscous drag coefficient between nut and screw
$K_m$ is the amplifier-motor torque gain constant
$F_m$ is the viscous drag of the motor It should be noted that coulomb friction has not been considered since the Lagrangian equations apply only to systems with ideal constraints. The effect of friction will be introduced later. Application of Equation 1 yields as the equations of motion of the system:

$$(M_s + I_s C^2)\ddot{x}_s + I_s C \ddot{\theta}_n = M_s a - F_{ns}\dot{x}_s \qquad (4)$$

$$I_s C \ddot{x}_s + (I_n + I_s)\ddot{\theta}_n = K_m x_s - F_m \theta_n \qquad (5)$$

The complete solution of these simultaneous equations can be found by use of the Laplace transformation. Of interest in the so-called steady state response since this yields the scale factor between applied acceleration and displacement of the nut. This can be shown to be of the form $$\theta_n = \frac{M_s}{I_s C + \dfrac{F_{ns} F_m}{K_m}} \iint a \, dt \, dt \qquad (6)$$

The effect of coulomb friction between the nut and screw in the general case is difficult to analyze. However, for the case of a constant acceleration and a critically damped system the effect of the friction will be $$\theta_n = \frac{M_s}{I_s C + \frac{F_{ns} F_m}{K_m}} \iint \left(a - \frac{F_c}{M_s}\right) dt\, dt \qquad (7)$$

The friction therefore establishes a minimum threshold below which the device will not respond. Coulomb friction between the nut and its bearing enters only during conditions of zero acceleration. For constant vehicle velocity the nut and screw should rotate together as a rigid body with no input to the motor. The friction between the nut and its bearings will tend to retard the nut relative to the screw calling for a corrective input to the motor. If there was zero friction between the nut and screw the system would have perfect velocity memory, however, because of friction there will be a gradual decay from a constant velocity condition.

The maximum speed of the vehicle determines the maximum speed of the motor. From Equation 6

$$\frac{\dot{\theta}}{v} = \frac{M_s}{I_s C + \frac{F_{ns} F_m}{K_m}} \approx \frac{M_s}{I_s C} = \frac{r \tan \alpha}{k_s^2} \qquad (8)$$

where $k_s$=radius of gyration of the screw.

The sensitivity of the device is limited primarily by the lead screw friction. Design analysis has shown that a ball bearing lead screw would be satisfactory at least down to acceleration of $10^{-2}$ g. A floated, buoyant rotor in a temperature controlled liquid would have sensitivity down to $10^{-4}$ g. The device is best suited to applications where the accelerations are low but where the distances to be measured are large. In these applications precise compensation for the effect of gravity is mandatory.

The characteristic of the device in minimizing the varying friction of the motor can be explained without reference to the analysis given above. Consider a steady state of constant velocity and assume zero friction between nut and screw. Since friction does not retard it, the screw's momentum will remain constant. Then, any change of motor speed results in a linear displacement of the screw and, in turn, a compensating error signal to force the motor speed to match the screw speed. In the theoretical case of zero $F_{ns}$, or infinite gain, the motor speed would remain constant.

Figure 9:
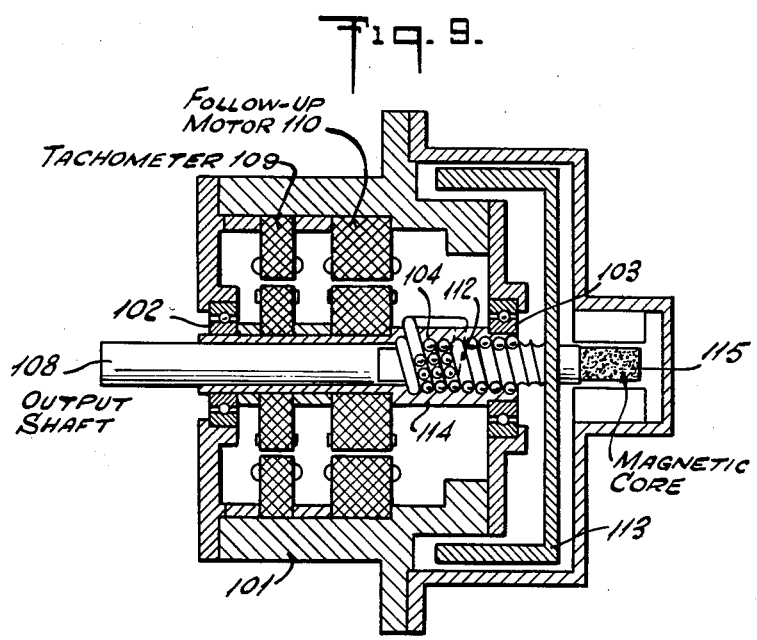
FIG. 9 is a sectional view of an accelerometer according to FIG. 8.

FIG. 9 shows the structural arrangement of the elements of FIG. 8. The motor 110 is mounted in a casing 101 and the rotor of the motor is fixed to the nut 114. Nut 114 is supported in the frame 101 by bearings 102 and 103 and is mounted on screw 112 by anti-friction bearings 104. Shaft 108 is fixed to nut 114. Flywheel 113 acts as the acceleration sensor. It is desirable that the acceleration mass 113 have dimensions such as to give a large radius of gyration and a small pitch radius in order for the maximum speed of the motor to be limited to a design speed corresponding to a maximum speed of the vehicle. The end of screw 112 is in the form of a magnetic core 115 which cooperates with a pick-off device 116 as schematically illustrated in FIG. 8. A tachometer 109 is preferably provided with its rotors fixed to nut 114, similar to and having the same function as tachometer 71 of FIG. 6. The left hand end of shaft 108 may be connected to a suitable output device such as a precision potentiometer which preferably has a linear characteristic and is preferably of the helical type. While the purpose of the tachometer is primarily to stabilize the servo loop it can also indicate vehicle velocity. The number of revolutions of the shaft 108 indicates the distance traveled by the vehicle. A gear train may be added to reduce the output shaft's speed relative to that of the motor.

Theoretically, a relative movement between the nut and the screw occurs only upon a change of acceleration. To overcome static friction and initiate movement of the screw, a certain minimum acceleration is required. In operation, however, the accelerometer is subjected to small oscillations induced by vibration and imperfect servo action. As a result, the screw is continuously in slight motion about a displaced position that is proportional to acceleration. The device performs, therefore, at a threshold friction less than the true static friction.

Referring to FIG. 10 there is shown an accelerometer in which the nut and screw mechanism of the previously described accelerometer is simulated by a magnetic screw with no metal to metal contact, thereby eliminating static friction. A housing 130 is provided with a connector 131 for attachment to the power supply, and with a chamber 133 for the amplifier and other accessories. Within the main portion of housing 130 there is a hermetically sealed casing 138 mounted on bearings 134 and 135. The casing is preferably filled with oil 136. An electric motor stator 137 is fixed to casing 138 and a rotor 139 is fixed to shaft 143. A second shaft 142 is driven by the rotor through gearing 140 in a reverse direction relative to shaft 143. The acceleration sensor is the cylindrical mass 141. The cylindrical mass 141 has a density greater than the lubricant fluid 136 and is supported on the hydrodynamic guide formed by the two low speed contra-rotating shafts 142 and 143. The hydrodynamic bearings thus provided keep the surfaces of cylinder 141 and shafts 142 and 143 continually separated by the fluid lubricant. With static friction eliminated at this bearing the slightest acceleration causes the mass float 141 to move along the axis. The contra-rotating shafts 142 and 143 apply equal and opposite viscous torques of the fluid with no net rotational effect on the mass float 141.

A shell 146 made of soft iron and having helical threads 145 is fixed to casing 138. Affixed to the cylindrical float 141 is a two pole permanent magnet 144 whose poles are spaced 180° apart and lined up with two helical threads 145. The poles of the magnet 144 are thus forced to move along the threads 145, since in so moving there is no change of reluctance; but they resist being moved transversely to the threads. A change in magnet strength has no effect on the functioning of the apparatus as long as the transverse holding force is enough to withstand the maximum expected linear acceleration.

As in the previous embodiments, a follow up motor 152 adapted to be driven by the output of the amplifier is provided for driving the casing 138 and the iron shell 146 in the direction mass 141 is rotating. Also as in previous embodiments, a tachometer 153 is provided for stabilizing the servo drive system. The end of the casing 138 may be closed by a suitable screw cap 155 and an expansion bellows 156. Within the casing 138 there is mounted the pick-off device 154 which corresponds to the pick-off device 116 of FIG. 8, for feeding an output to the amplifier. The magnetic core 157 is attached to the end of the mass float 141 to cooperate with the pick-off device. A heater 159 may be provided in housing 130 for maintaining the elements and particularly the fluid at a desirable temperature. Current is fed to the elements in and on the casing 138 by means of slip rings 160. The output of the accelerometer may be applied to a potentiometer or other suitable recording or measuring device by means of the output shaft 161.

The operation of the accelerometer in FIG. 10 will be understood from the previous explanations. Briefly, the cylindrical mass 141 senses a linear acceleration. The mass, however, is constrained to move along the helical path by the magnet 144 and the threads 145 of the iron shell 146. Thus, in response to an acceleration the mass 141 functions as a screw with respect to the threads 145 of the magnetic nut or shell 146. In so doing, the magnetic core 157 moves linearly with respect to the pick-off device 154 and this, as explained in connection with FIGS. 1 and 8, applies a signal to the amplifier which controls the motor 152. This motor drives casing 138 and magnetic nut 145 to restore the equilibrium condition, in the same manner as explained in connection with FIGS. 1 and 8.

The motor 137 is preferably of the induction type provided with a large number of poles to give a low synchronous speed. Operation at well below synchronous speed, say approximately 100 r.p.m. can be obtained by loading the motor with a viscous friction drag in a small gap between the stator and rotor. The function of this motor is only to produce a contra-rotation of shafts 142 and 143 in order to provide a floating support for mass 141 without viscous drag. A partition 151 may be provided between the gearing and the portion of the casing which encloses the mass 141 in order to prevent oil turbulence caused by the gears and other moving parts from disturbing the oil surrounding the mass float 141.

Although certain specific embodiments have been shown and described many modifications and variations are possible without departing from the spirit of the present invention. Therefore, this invention is not to be limited except insofar as is necessary by the prior art and the scope of the appended claims.

What is claimed is:

1. An integrating accelerometer comprising an electric motor, a screw connected to be driven by said motor, a nut mounted free running on said screw, sensing means responsive to the position of said nut on said screw, an amplifier having its output connected to said motor for controlling the direction and speed of rotation of the motor, said sensing means being connected to the input of said amplifier for controlling the output thereof in accordance with the position of said nut, and means connected to said screw for measuring its motion.

2. An apparatus according to claim 1, wherein said nut and said screw include helical grooves and balls filling in said grooves for mounting the nut on the screw.

3. An integrating accelerometer comprising a motor, a screw driven by said motor, an inertia nut mounted on said screw and means connected between said screw and said motor for rotating said screw by said motor with an acceleration corresponding to the displacement of the nut caused by an acceleration or deceleration, and means coupled to said screw for measuring the integral of the change in velocity of the nut.

4. An integrating accelerometer comprising a continuously rotating electric motor, a shaft connected to said motor, a pair of permanent magnet rotors, means coupling said rotors to said shaft for driving the rotors in opposite directions, a second shaft extending through said rotors, said second shaft having a screw on one portion thereof, a low friction inertia nut mounted on said screw for displacement with respect to said screw in response to a change in velocity, a pair of drag cups connected to said nut for moving toward one of said permanent magnet rotors and away from the other in response to an axial displacement of said nut, said drag cups being connected to said second shaft for rotating the latter in one direction or the other in response to a displacement of the drag cups in one direction or the other, and means connected to said second shaft for measuring its angular velocity and angular displacement.

5. An integrating accelerometer comprising an electric motor, a screw member and a low friction nut member mounted on said screw member, sensing means responsive to the position of a first of said members, said motor being connected to drive the other member, an amplifier having its output connected to said motor for controlling the rotation of the motor, said sensing means being connected to the input of said amplifier for controlling the output thereof in accordance with the position of said first member and means connected to said other member for measuring its angular velocity and its angular displacement.

6. An integrating accelerometer comprising an electric motor, a nut having a vertical axis connected to be driven by said motor, a vertical screw mounted in said nut, sensing means responsive to the position of said screw, an amplifier having its output connected to said motor for controlling the rotation of the motor, said sensing means being connected to the input of said amplifier for controlling the output thereof in accordance with the position of said screw, a helical potentiometer connected to said nut for measuring its angular velocity and its angular displacement, and a one $g$ spring connected between the screw and nut to compensate for gravity.

7. An accelerometer comprising a housing having therewithin a rotatable casing, said casing being adapted to contain a lubricant, a pair of coaxial shafts mounted in said casing, means for rotating said shafts in opposite directions, an acceleration sensing cylindrical mass rotatably mounted on said shafts, a magnet mounted on said mass, a magnetic shell having a helical thread surrounding said magnet and opposite to said magnet and fixed to said casing, means for producing an electrical signal in response to the axial displacement of said cylindrical mass, means for rotating said casing in response to said signal in a direction to restore an equilibrium condition, and means responsive to the rotation of the casing for measuring the acceleration.

8. An accelerometer comprising a housing having therewithin a rotatably mounted cylindrical casing, an acceleration sensing mass rotatably mounted in said casing, a magnet mounted on said mass, a magnetic shell having a helical thread surrounding said magnet and located opposite to said magnet and fixed to said casing, means for producing an electrical signal in response to the axial displacement of said mass, means for rotating said casing in response to said signal in a direction to restore an equilibrium condition, and means responsive to the rotation of the casing for measuring the acceleration.

9. An integrating accelerometer comprising a motor, a screw, a nut rotatably mounted on said screw, low friction mounting means between said nut and screw for producing a relative displacement therebetween in response to a linear acceleration or deceleration, means connected between said screw and said motor for rotating said screw by said motor with an acceleration corresponding to the relative displacement of the screw and nut caused by a linear acceleration or deceleration, and means coupled to said screw for measuring its rotation.

References Cited in the file of this patent

UNITED STATES PATENTS

| 2,427,239 | Taylor | Sept. 9, 1947 |
| 2,805,549 | Hensleigh et al. | Sept. 10, 1957 |
| 2,882,034 | Wuerth | Apr. 14, 1959 |